(12) United States Patent
Hsu

(10) Patent No.: US 8,267,413 B1
(45) Date of Patent: *Sep. 18, 2012

(54) CAMBER ARM AND BALL JOINT ASSEMBLY

(75) Inventor: David Hsu, Norco, CA (US)

(73) Assignee: Group-A Autosports, Inc., Norco, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 12/898,866

(22) Filed: Oct. 6, 2010

Related U.S. Application Data

(63) Continuation of application No. 12/234,287, filed on Sep. 19, 2008, now Pat. No. 7,857,332.

(51) Int. Cl.
*B62D 17/00* (2006.01)
(52) U.S. Cl. ............................ 280/86.757; 280/86.751
(58) Field of Classification Search ............... 280/5.521, 280/86.751, 86.757
See application file for complete search history.

(56) References Cited

U.S. PATENT DOCUMENTS 7,857,332 B2 * 12/2010 Hsu ........................ 280/86.757

* cited by examiner

*Primary Examiner* — Paul N Dickson
*Assistant Examiner* — Laura Freedman
(74) *Attorney, Agent, or Firm* — Steven N. Fox, Esq.

(57) ABSTRACT

The present invention is a device for adjusting the camber angle of a tire/wheel assembly of a vehicle. The device comprises a camber arm having a cage. The cage comprises a cavity and front and top walls. The top wall comprises first and second slots. The cage further comprising a cut-out extending along the front and top walls. The device further comprises a ball joint assembly adjustably engaged with the cage. The device further comprises a fastener for securing the upper clamping plate to the lower clamping plate of the ball joint assembly. The ball joint assembly is adjustably moved along the first and second slots of the cage from a first position where the outward portion of the ball joint housing is disposed outside of the cavity of the cage and a second position where the outward portion of the ball joint housing is disposed within the cavity.

19 Claims, 15 Drawing Sheets

US 8,267,413 B1

CAMBER ARM AND BALL JOINT ASSEMBLY

CROSS-REFERENCE TO RELATED APPLICATIONS

This application is a continuation of application Ser. No. 12/234,287 filed on Sep. 19, 2008, now pending, which is hereby incorporated by reference in its entirety into this specification.

BACKGROUND OF THE INVENTION

A camber arm is used to adjust the camber angle of a tire/wheel assembly of a vehicle. The camber angle is the inward or outward tilt of the tire/wheel assembly and is measured from a true vertical line perpendicular to the ground. A tire/wheel assembly that is tilted outward at the top is considered to have positive camber. In contrast, a tire/wheel assembly tilted inward at the top is considered to have negative camber. For a zero setting, the tire/wheel assembly is in an exact vertical position or perpendicular to the ground. Positive camber results in a dynamic loading that allows the tire to run relatively flat against the road surface. Positive camber directs the weight and shock load of the vehicle on the larger inner wheel bearing and inboard portion of the spindle rather than the outboard bearing. A moderate positive camber results in longer bearing life, less likely sudden load failure, and easier steering. Excessive positive camber wears the outside of the tire and may cause wear to suspension pans such as wheel bearings and spindles. Negative camber on be used to improve the handling of a vehicle. A setting of ½° negative on both sides of a street car will improve cornering without affecting tire life greatly. This negative setting compensates for the slight positive camber change of the outside tire due to vehicle roll, thereby allowing a flatter tire contact patch during cornering. Excessive negative camber wears the inside of the tire and can cause wear and stress on suspension parts. Conventional devices do not allow the camber angle to be adjusted between a satisfactory range of positive and negative camber angles without failure under severe dynamic loads.

SUMMARY OF THE INVENTION

One object of the present invention is to provide a camber arm that allows the camber angle to be adjusted between a wider range of positive and negative camber angles without failure under severe dynamic loads.

The present invention is a device for adjusting the camber angle of a tire/wheel assembly of a vehicle. In one embodiment, the device comprises a camber arm having first and second arms and a cage. The cage comprises a cavity, a top wall, a front wall, and first and second sidewalls. The first and second arms are connected to the first and second sidewalls of the cage. The top wall comprises an outside surface, an inside surface, and first and second slots. The cage further comprising a cut-out extending along the front and top walls. The device further comprises a ball joint assembly adjustably engaged with the cage. The ball joint assembly comprises a ball joint housing and a lower clamping plate that is adjustably fastened to the inside surface of the top wall. The ball joint housing has an outward portion and an inward portion. The device further comprises an upper clamping plate having an outside surface, an inside surface, a plurality of mounting holes, a front edge portion, first and second side edge portions, and a cut-out having an inner edge portion. The cut-out extends inward from the front edge portion to the inner edge portion to allow access to the ball joint housing when assembled. The device further comprises a plurality of bolts for fastening the upper clamping plate and the lower clamping plate of the ball joint assembly to the top wall of the cage. The ball joint assembly may be adjustably moved within the first and second slots from a first position where the outward portion of the ball joint housing is disposed outside of the cavity of the cage and a second position where the outward portion of the ball joint housing is disposed within the cavity of the cage.

BRIEF DESCRIPTION OF THE DRAWINGS

The following detailed description of the invention will more fully understood with reference to the accompanying drawings wherein.

DESCRIPTION OF THE INVENTION

Figures 1, 2:
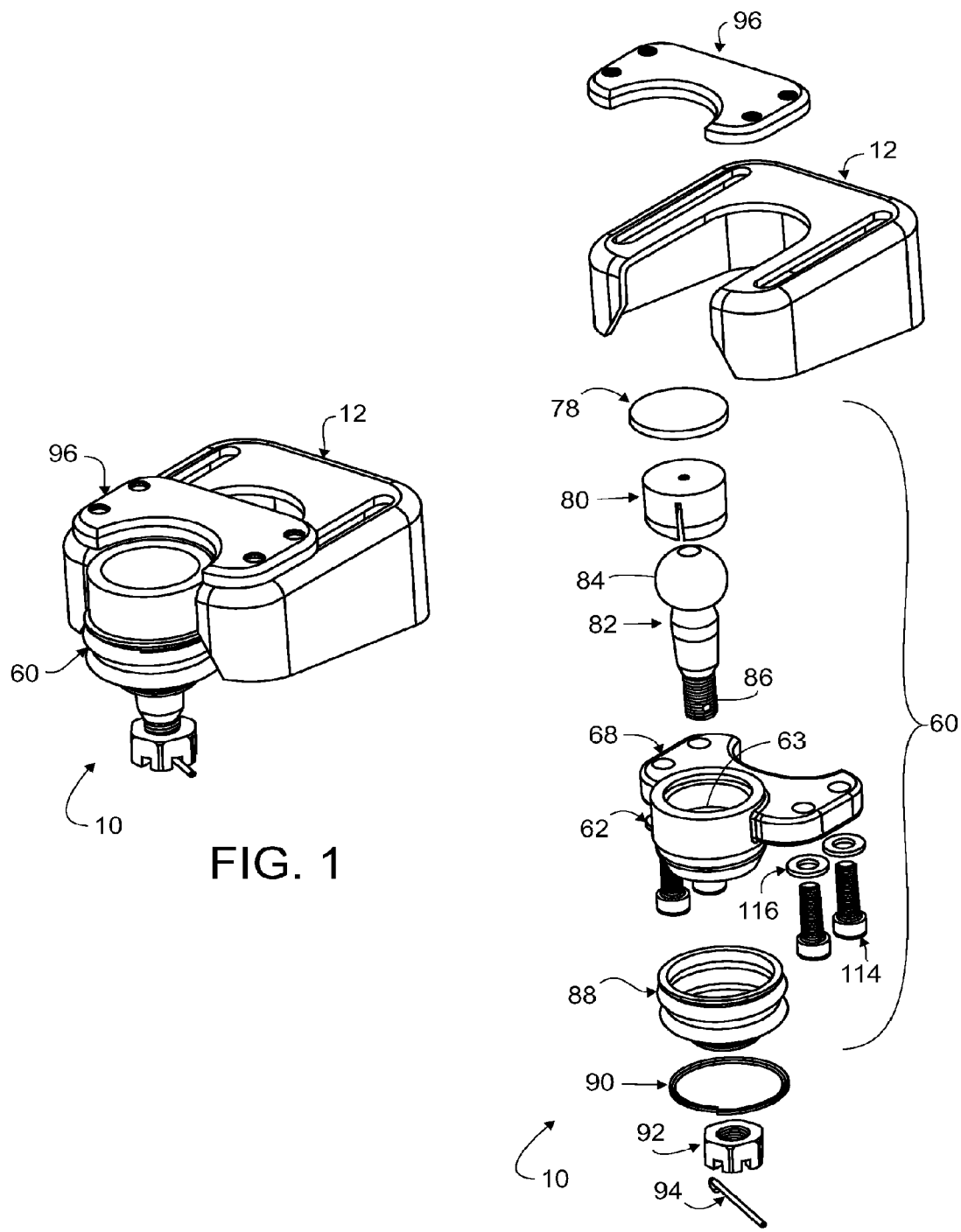
FIG. 1 is a perspective view of a camber arm assembly according to the present invention shown without left and right camber arms.
FIG. 2 is an exploded view of the camber arm assembly.

Referring to FIGS. 1-2, the present invention is a device 10 for adjusting the camber angle of a tire/wheel assembly (not shown) of a vehicle. In one embodiment, device 10 generally comprises a camber arm assembly 12, a ball joint assembly 60, and an upper clamping plate 96. For ease of illustration, left and right arms 14 and 20 (to be described) are not shown. Ball joint assembly 60 may be adjustably positioned on camber arm assembly 12 and secured thereto by upper clamping plate 96 and bolts 114 and washers 116.

Referring to FIGS. 6-15, camber arm assembly 12 generally comprises left and right arms 14 and 20, and a central cage 26. Left arm 14 generally comprises a first end portion 16 and a second end portion 18. Right arm 20 generally comprises a first end portion 22 and a second end portion 24. Cage 26 generally comprises a cavity 28, a top wall 30, a front wall 44, first and second sidewalks 52 and 54, and a rear wall 56. Cage 26 further comprises a large cut-out 50 formed by a cut-out 42 (to be described) along top wall 30 and a cut-out 48 (to be described) along front wall 44. Second end portions 18 and 24 of first and second arms 14 and 20 are adapted for connection to the chassis frame (not shown) of the vehicle. In the embodiment shown, end portions 16 and 22 of first and second arms 14 and 20 are secured to left and right sidewalls 52 and 54 (to be described) of cage 26, respectively, by conventional means such as welding. Arms 14 and 20 may be of any desired shape and configuration based upon the chassis frame or other vehicle specifications. Top wall 30 of cage 26 comprises an outside surface 32, an inside surface 34, and first and second slots 36 and 38; and a cut-out 42. First and second slots 36 and 38 receive bolts 114 so that upper clamping plate 96 and lower clamping plate 68 of ball joint assembly 60 may be adjustably secured to and along top wall 30 of cage 26 by sliding the assembly within slots 36 and 38. Front wall 44 comprises a bottom edge 46 and a cut-out 48. Arms 14 and 20, and cage 26 are made from steel and fabricated by conventional stamping and machining operations.

Referring to FIGS. 2 and 16-23, ball joint assembly 60 comprises a ball joint housing 62 having a cavity 63, an inward portion 64, and an outward portion 66. Ball joint assembly 60 further comprises a lower clamping plate 68 extending outward from inward portion 64. Lower clamping plate 68 comprises an upper surface 70, a lower surface 72, mounting holes 74, and a cut-out 76. In the embodiment shown, mounting holes 74 are clearance holes to receive bolts 114 which are then threaded into mounting holes 102 (to be described) of upper clamping plate 96. In other embodiments, mounting holes 74 may be threaded holes and mounting holes 102 (to be described) of upper clamping plate 96 may be clearance holes wherein bolts 114 would be inserted into clearance holes 102 (to be described) and then threaded into mounting holes 74. Housing 62 and lower clamping plate 68 are made from steel and fabricated as a single cast piece by conventional casting and machining operations. As best shown by FIG. 2, ball joint assembly 60 further comprises a ball joint 82 having a ball portion 84 and a threaded end portion 86. Ball joint assembly 60 further comprises a plastic sleeve 80 and a housing cover 78. Sleeve 80 is disposed about ball portion 84 of ball joint 82 and inserted within cavity 63 of ball joint housing 62 such that threaded end portion 86 extends downward out of cavity 63. Cover 78 is removably engaged with ball joint housing 62 by a force-fit to enclose cavity 63. Ball joint 82, sleeve 80, and housing cover 78 are well known in the industry and widely available. Ball joint assembly 60 further comprises a rubber dust boot 88 to prevent dust or other contamination from entering cavity 63 of ball joint housing 62. Dust boot 88 is well known in the industry and widely available. Ball joint assembly 60 further comprises a locking ring 90 to retain dust boot 88 about ball joint housing 62. Locking ring 90 is well known in the industry and widely available. Ball joint assembly 60 further comprises a castle nut 92 and a locking pin 94 to prevent the spindle or steering knuckle (not shown) from being disengaged from ball joint 82. Nut 92 and locking pin 94 are well known in the industry and widely available.

Referring to FIGS. 24-30, upper clamping plate 96 comprises an upper surface 98, a lower surface 100, and a plurality of threaded mounting holes 102 extending from upper surface 98 to lower surface 100. Upper clamping plate 96 further comprises side edges portions 104 and 106, a front edge portion 108, and a cut-out 110 having an inner edge portion 112. Cut-out 110 extends inward from front edge portion 108 to inner edge portion 112 to allow access to cover 78 of ball joint housing 62 when assembled. Upon assembly of upper clamping plate 96 to lower clamping, plate 68 of ball joint assembly 60, inner edge portion 112 is substantially aligned and/or immediately adjacent or juxtaposed to inward portion of 64 of ball joint housing 62 thereby allowing a person access to cover 78 and cavity 63 to repair or replace ball joint 82 and/or sleeve 80. Upper clamping plate 96 is made from steel and fabricated by conventional machining operations.

Figure 3:
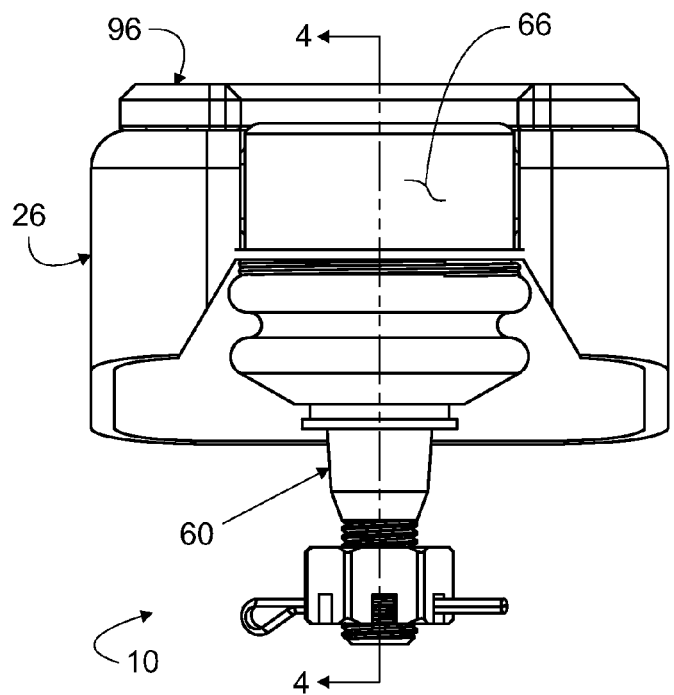
FIG. 3 is a front elevation view of the camber arm assembly.
Figure 5:
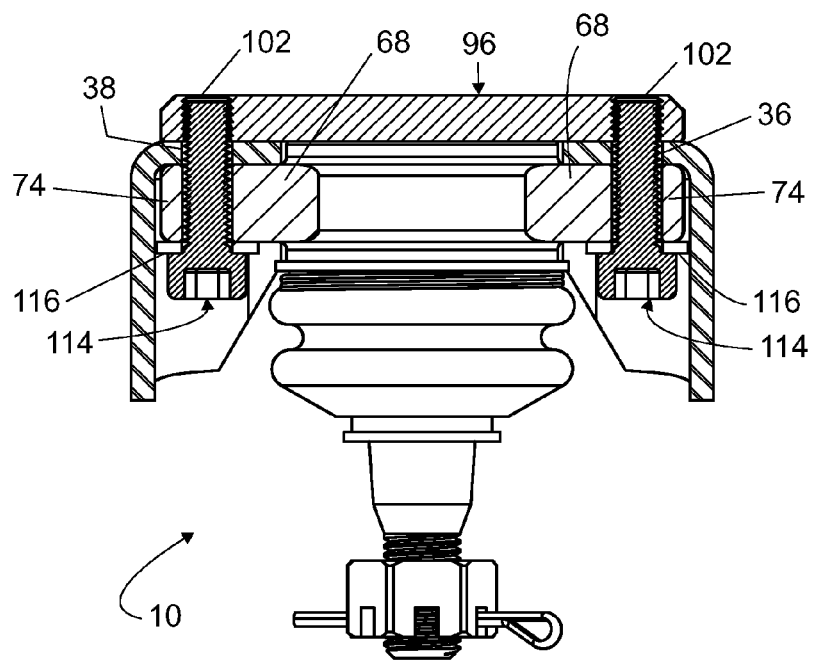
FIG. 5 is a cross-section view taken along line 5-5 of FIG. 4-A.
Figure 4A:
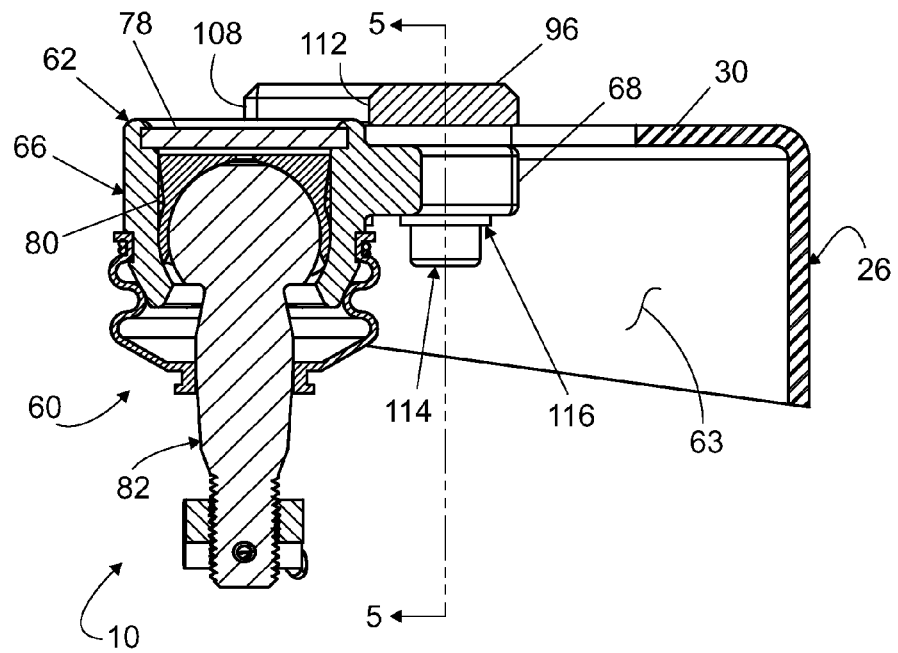
FIG. 4A is a cross-section view taken along line 4-4 of FIG. 3 showing the outward portion of the ball joint housing disposed outward of the cavity of the cage.
Figure 4B:
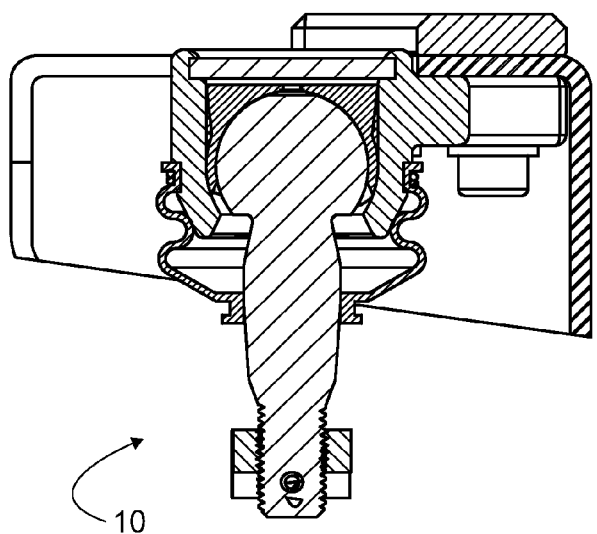
FIG. 4B is a cross-section view taken along line 4-4 of FIG. 3 showing the outward portion of the ball joint housing disposed within the cavity of the cage.
Figure 6:
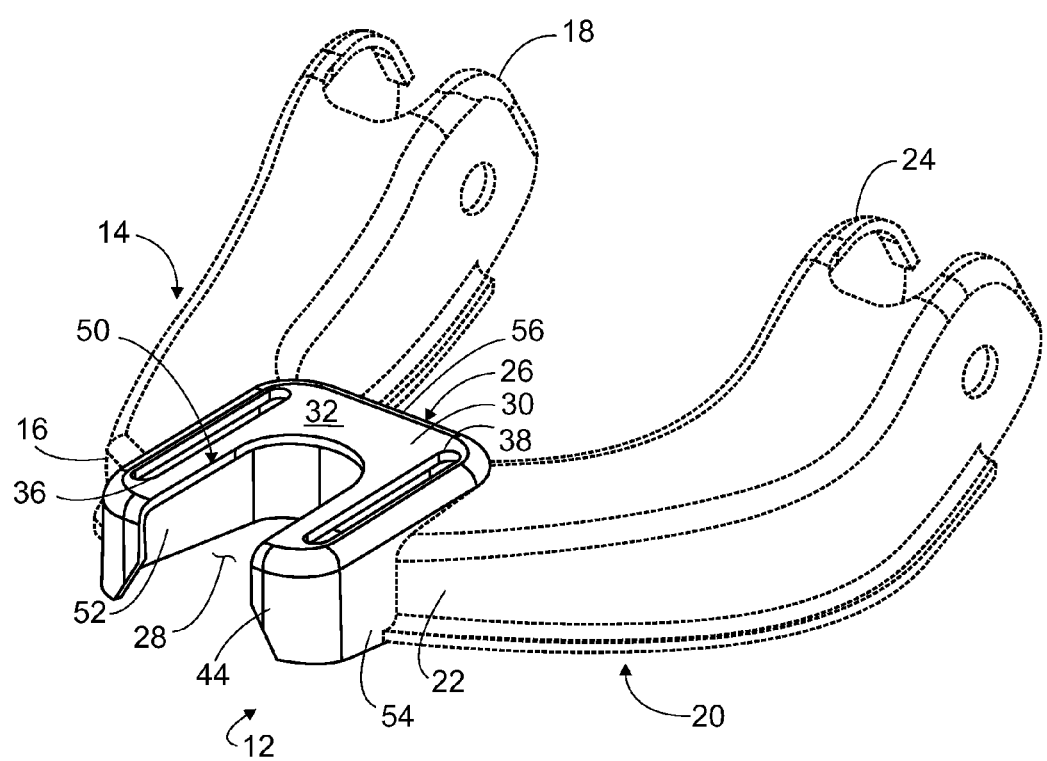
FIGS. 6 and 7 are top front perspective views of the camber arm.
Figure 7:
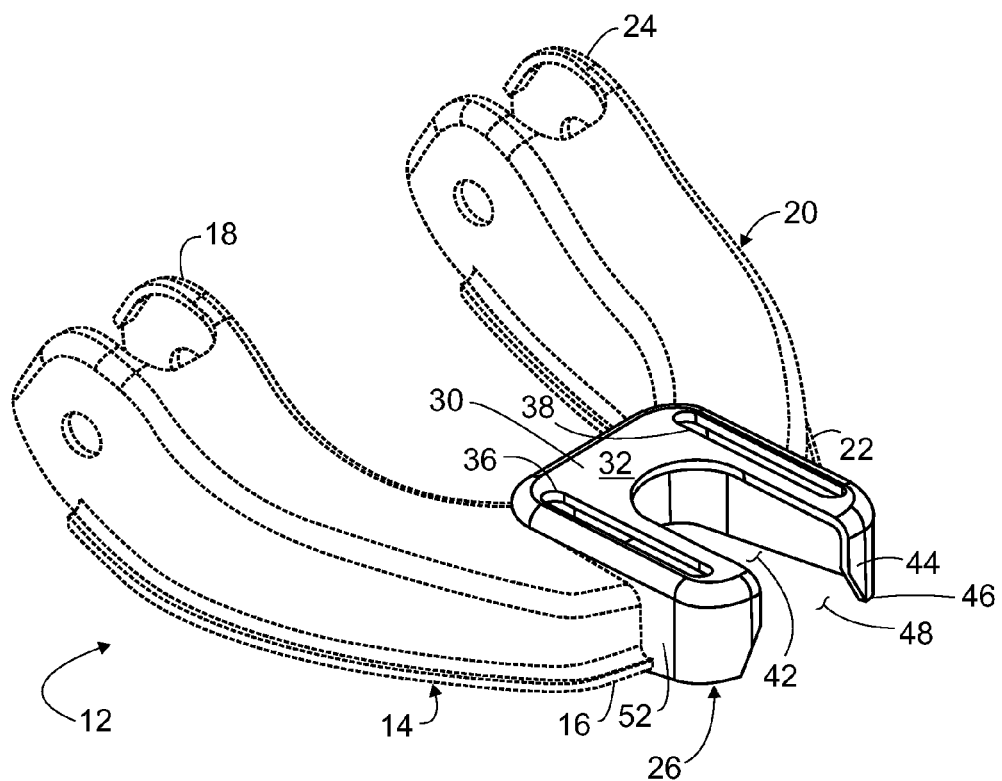
Figure 8:
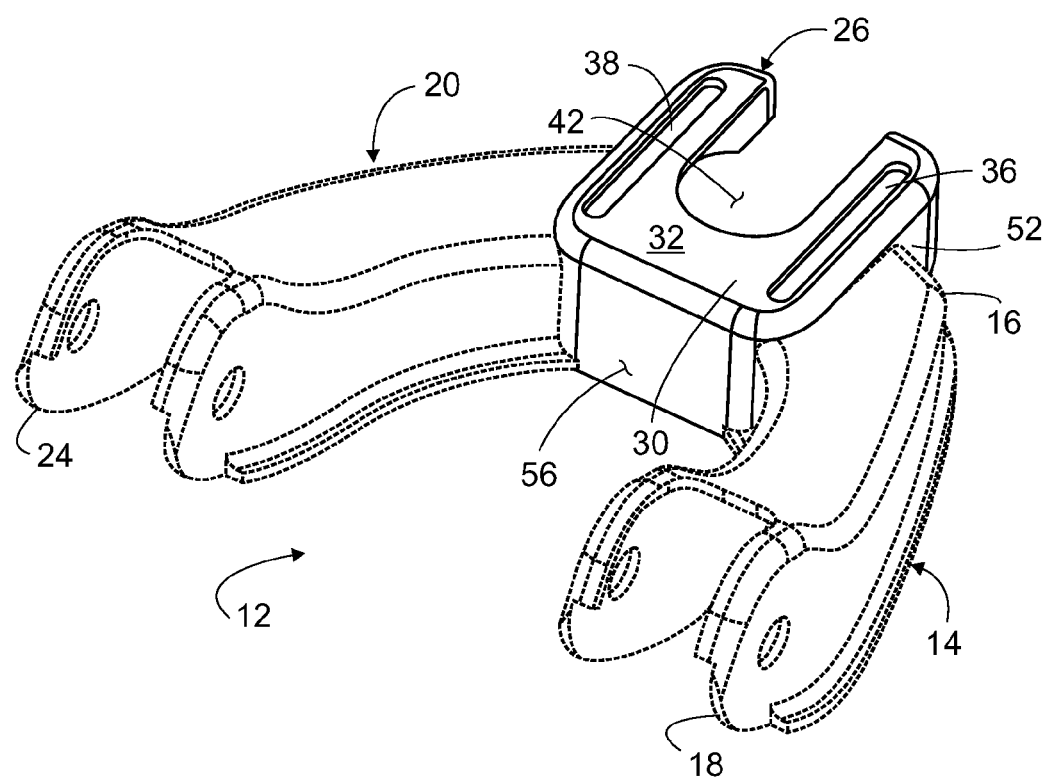
FIG. 8 is a top rear perspective view of the camber arm.
Figure 9:
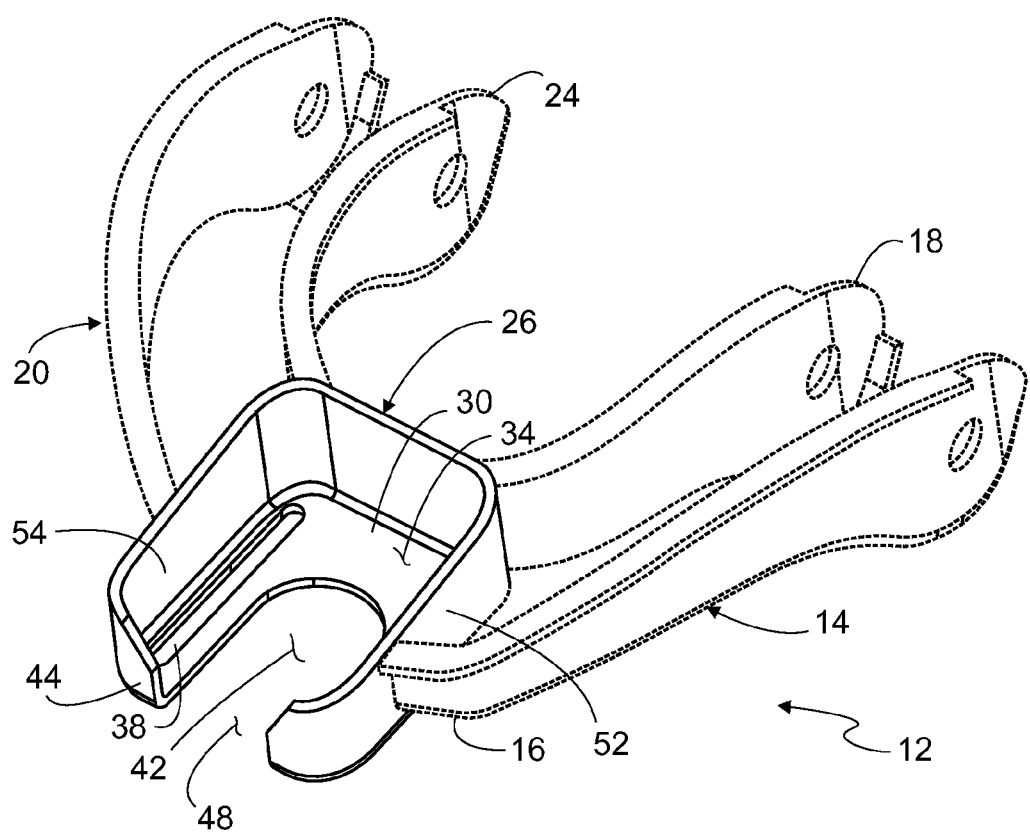
FIG. 9 is a bottom front perspective view of the camber arm.
Figure 10:
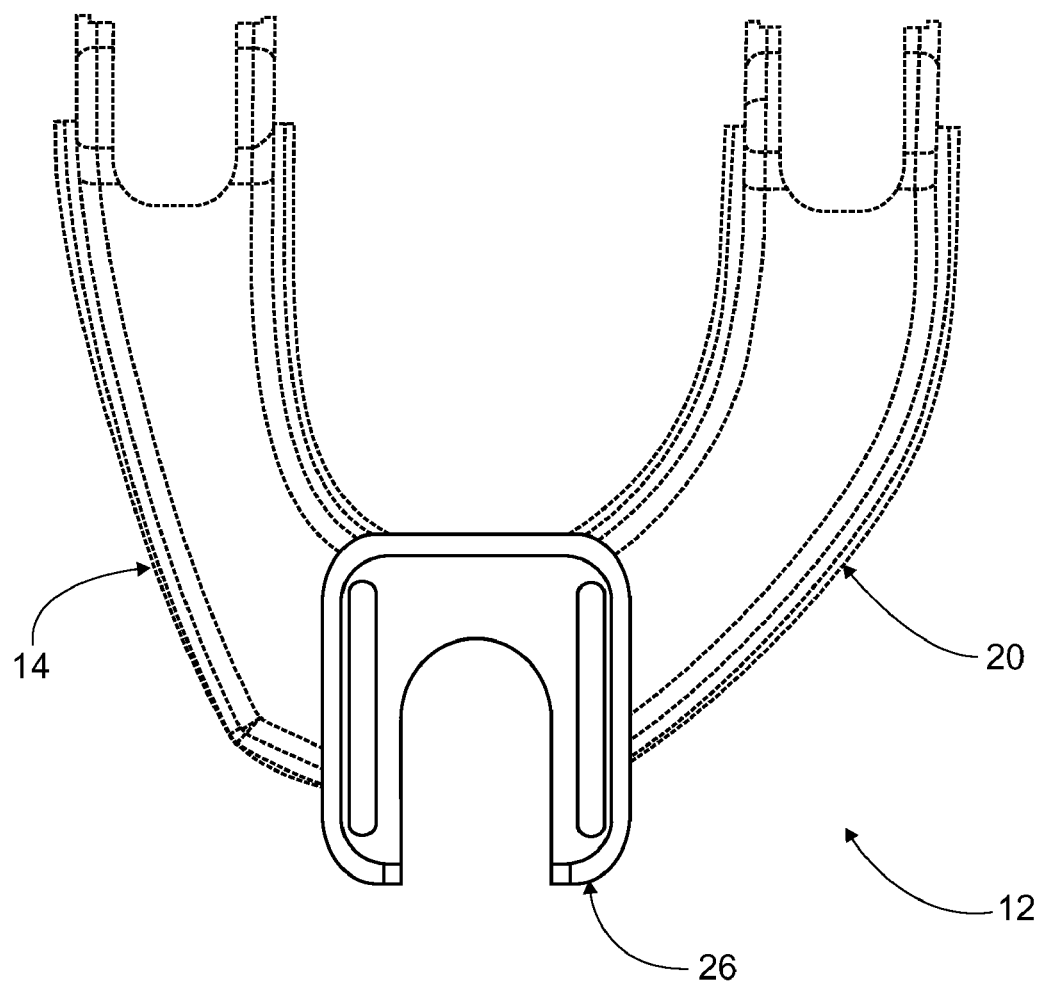
FIG. 10 is a top plan view of the camber arm.
Figure 11:
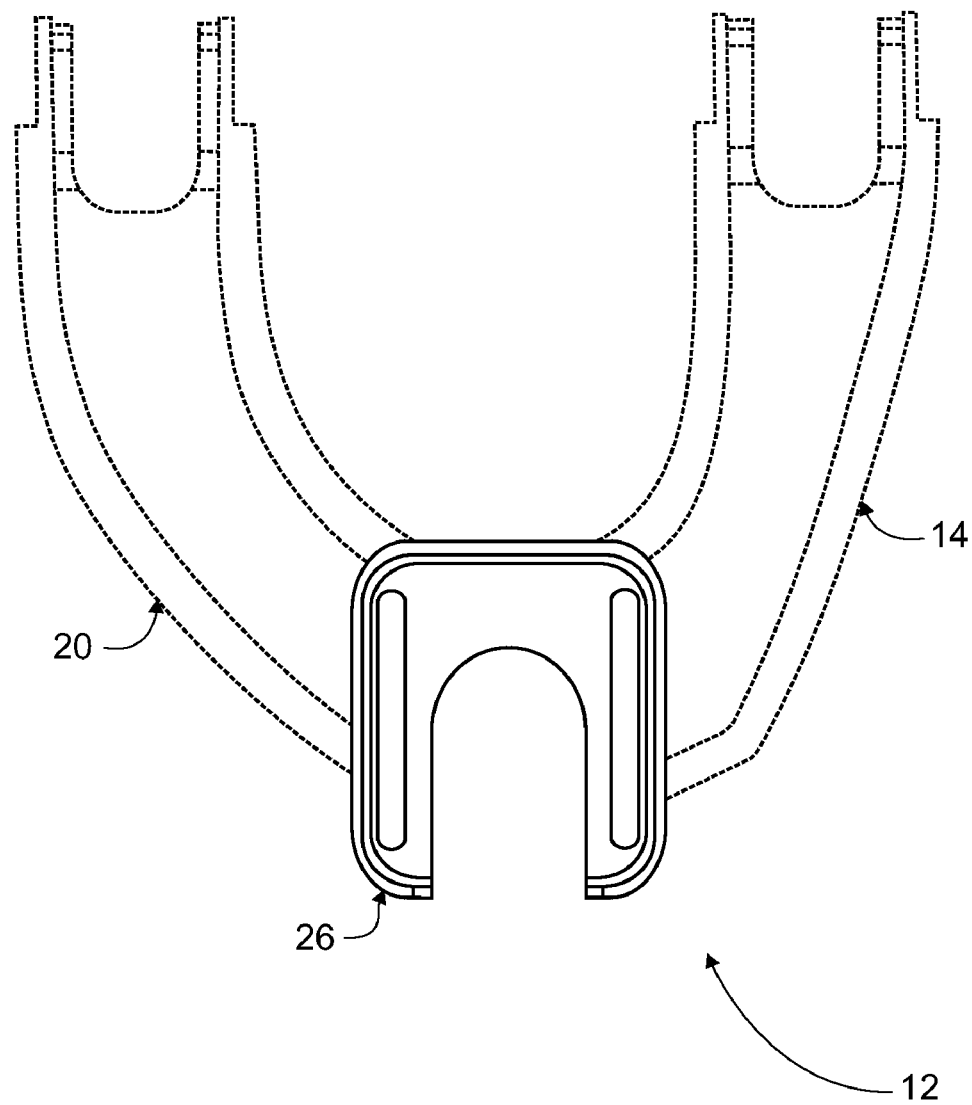
FIG. 11 is a bottom plan view of the camber arm.
Figure 12:
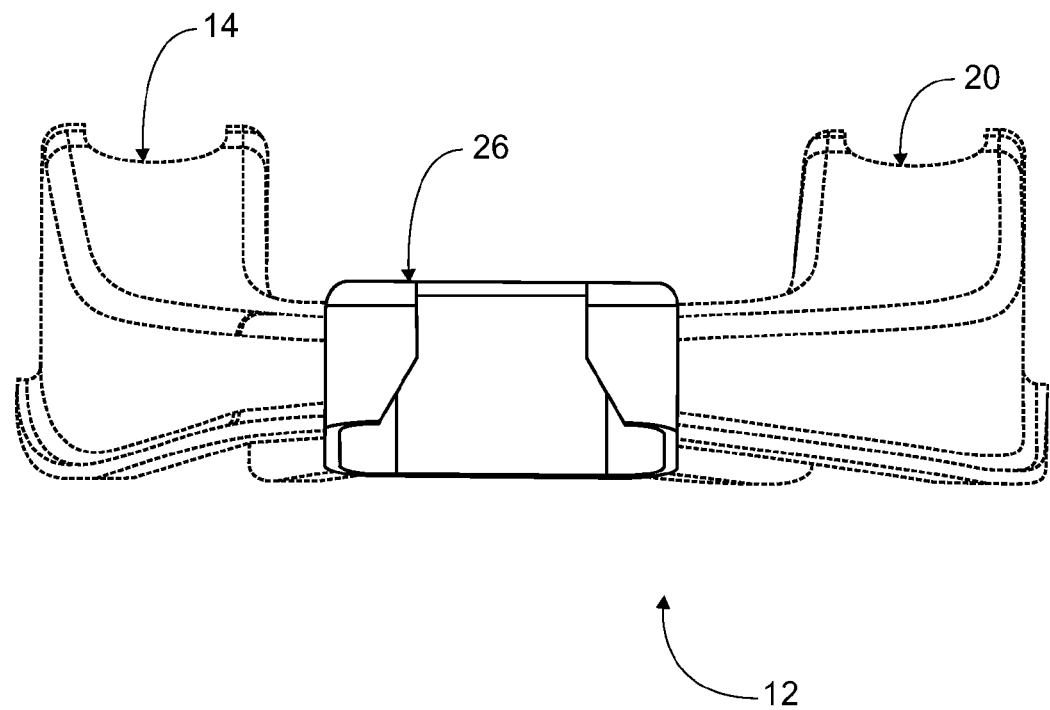
FIG. 12 is a front elevation view of the camber arm.
Figure 13:
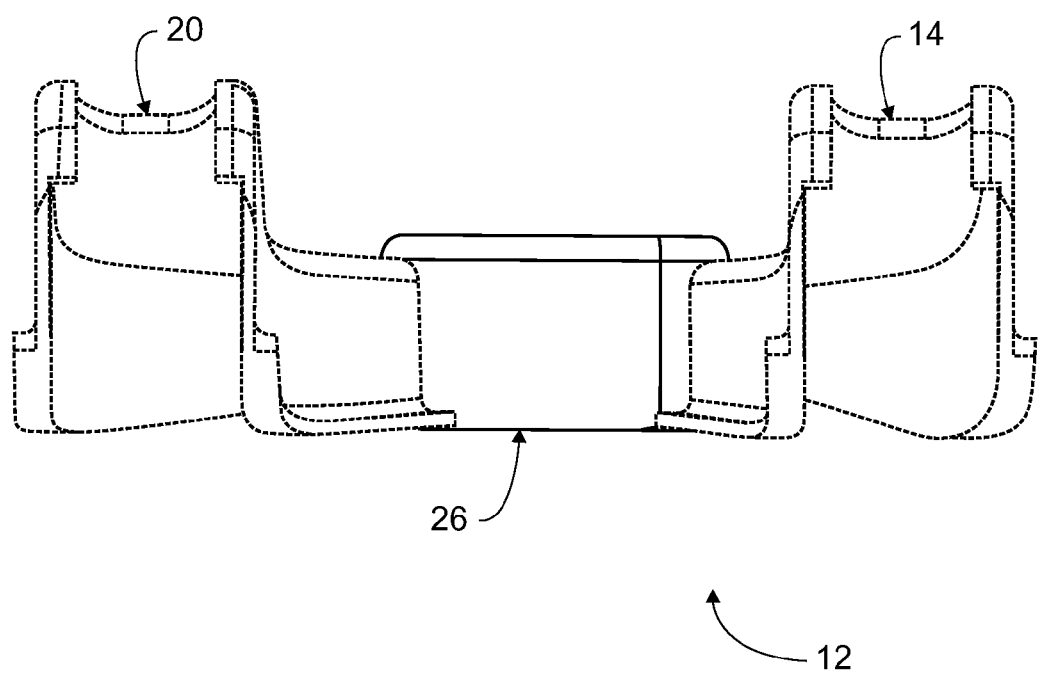
FIG. 13 is a rear elevation view of the camber arm.
Figure 14:
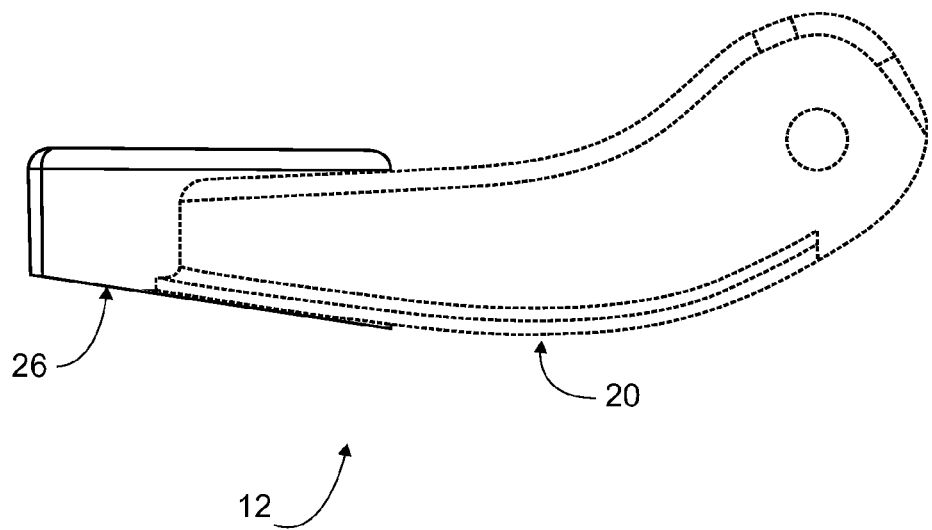
FIG. 14 is a left side elevation view of the camber arm.
Figure 15:
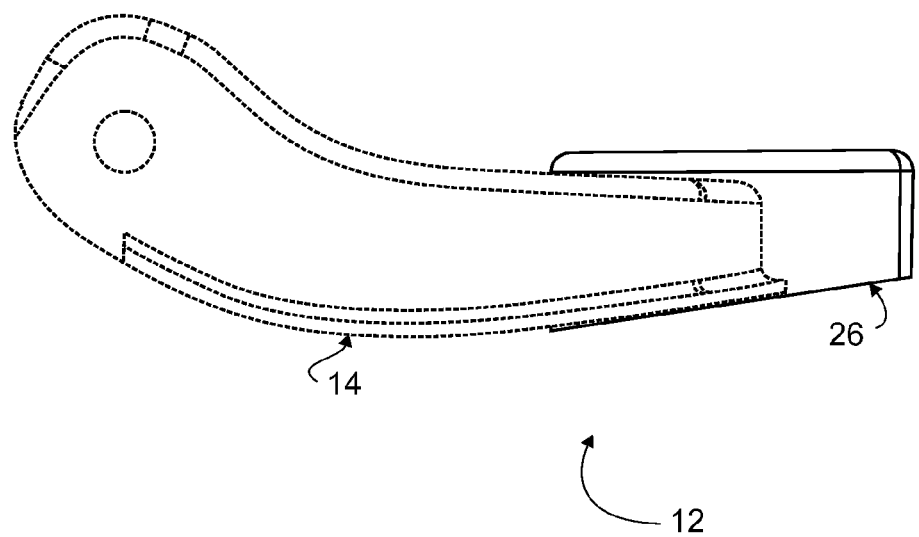
FIG. 15 is a right side elevation view of the camber arm.
Figure 16:
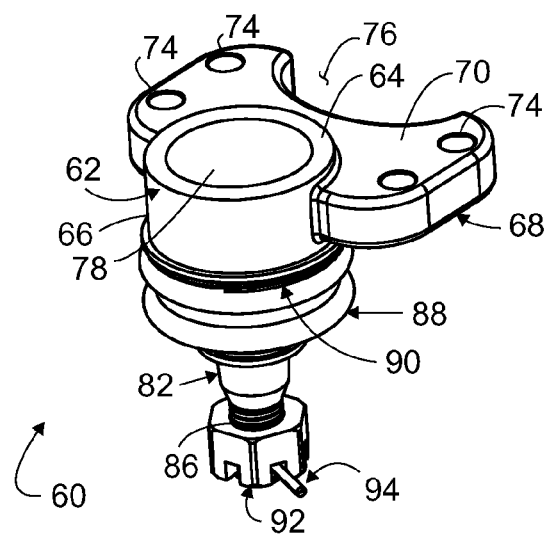
FIG. 16 is a top perspective view of a ball joint assembly according to the present invention.
Figure 17:
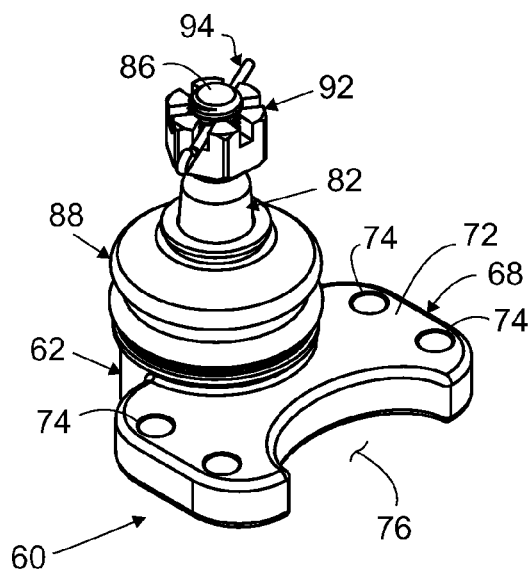
FIG. 17 is a bottom perspective view of the ball joint assembly.
Figure 18:
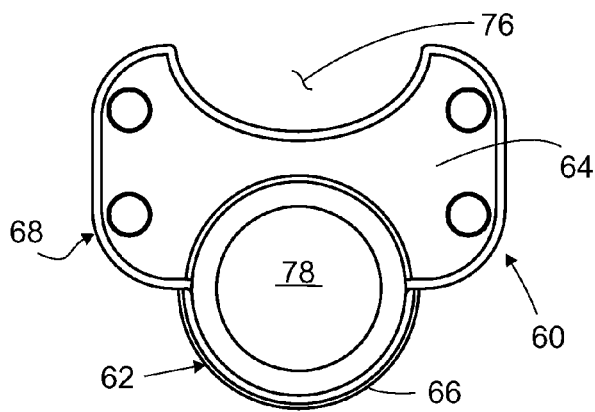
FIG. 18 is a top plan view of the ball joint assembly.
Figure 19:
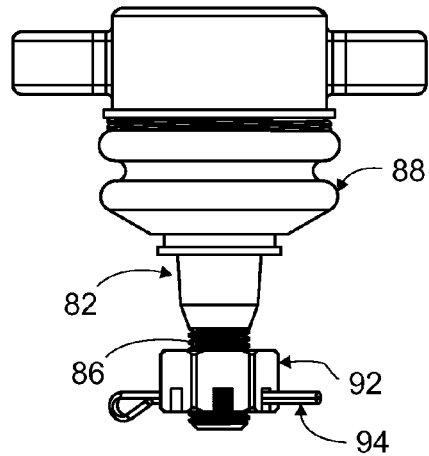
FIG. 19 is a front elevation view of the ball joint assembly.
Figure 21:
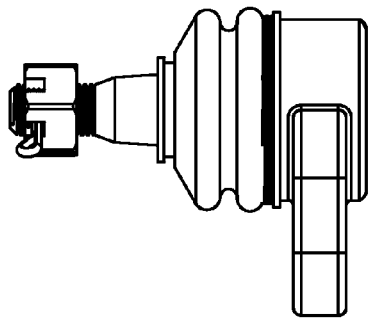
FIG. 21 is a left side elevation view of the ball joint assembly.
Figure 20:
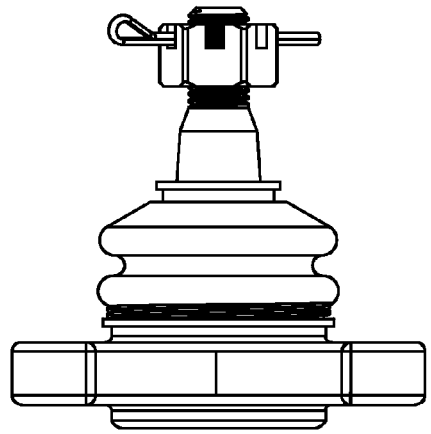
FIG. 20 is a rear elevation view of the ball joint assembly.
Figure 22:
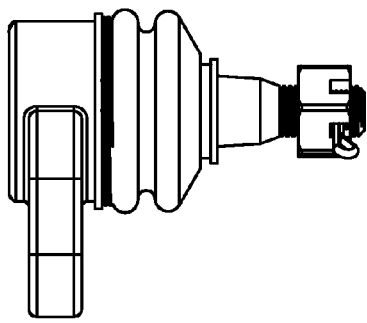
FIG. 22 is a right side elevation view of the ball joint assembly.
Figure 23:
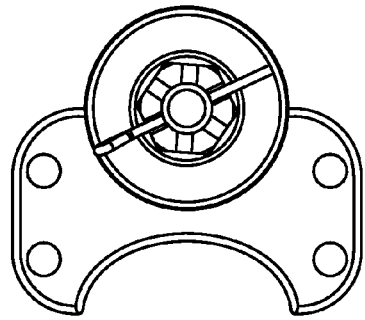
FIG. 23 is a bottom plan view of the ball joint assembly.
Figure 24:
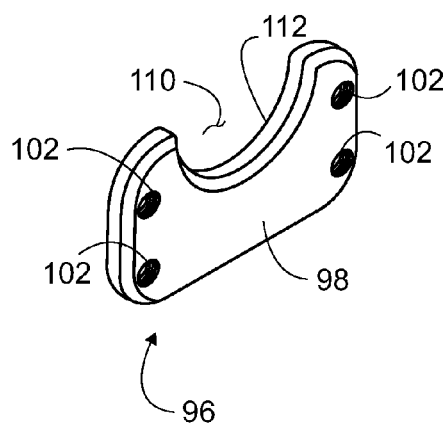
FIG. 24 is a top perspective view of an upper clamping plate according to the present invention.
Figure 25:
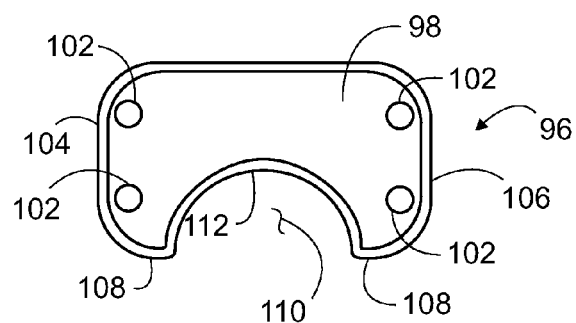
FIG. 25 is a top plan view of the upper clamping plate.
Figure 26:
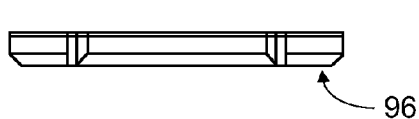
FIG. 26 is a front elevation view of the upper clamping plate.
Figure 27:
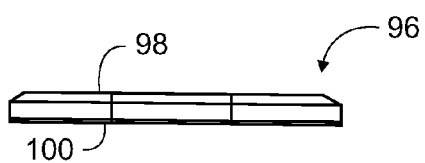
FIG. 27 is a rear elevation view of the upper clamping plate.
Figure 28:
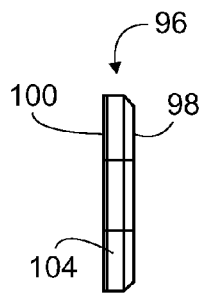
FIG. 28 is a left side elevation view of the upper clamping plate.
Figure 29:
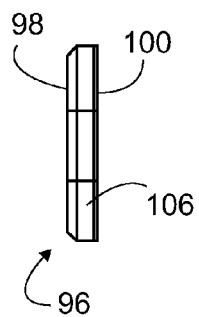
FIG. 29 is a right side elevation view of the upper clamping plate.
Figure 30:
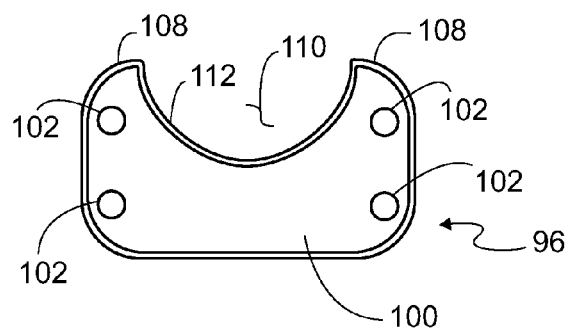
FIG. 30 is a bottom plan view of the upper clamping plate.

Referring to FIGS. 3-5, bolts 114 and washers 116 securely fasten upper clamping plate 96 and lower clamping plate 68 of ball joint assembly 60 to top wall 30 of cage 26. In the embodiment shown, lower surface 100 of upper clamping plate 95 is engaged with outside surface 32 of top wall 30 of cage 26, and upper surface 70 of lowering clamping plate 68 of ball joint assembly 60 is engaged with inside surface 34 of to wall 30 of cage 26. Alternatively, lower surface 72 of lowering clamping plate 68 of ball joint assembly 60 may be engaged with outside surface 32 of top wall 30 of cage 26, and upper surface 98 of upper clamping plate 96 may be engaged with inside surface 34, of top wall 30 of cage 26. In either fastening configuration, ball joint assembly 60 may be adjustably moved anywhere between a first position where outward portion 66 of ball joint housing 62 is disposed outside of cavity 63 (FIG. 4A) and a second position where outward portion 66 of ball joint housing 62 is disposed within cavity 63 (FIG. 4B). As described heretofore, mounting holes 74 of lower clamping plate 68 are clearance holes to receive or allow passage of bolts 114 which are then inserted thru slots 36 and 38 of cage 26, and then threaded into threaded mounting holes 102 of upper clamping plate 96. In other embodiments, mounting holes 74 may be threaded holes and mounting holes 102 of upper clamping plate 96 may be clearance holes wherein bolts 114 would be inserted into clearance holes 102 and then threaded into mounting holes 74.

The foregoing description is intended for purposes of illustration. The invention may be embodied in other forms or carried out in other ways without departing from the spirit or scope of the invention.

What is claimed:

1. A device for adjusting a camber angle of a tire/wheel assembly of a vehicle comprising:
   a camber arm comprising a cage; said cage comprises a cavity, a top wall, a front wall, and first and second sidewalls; said top wall comprises an outside surface, an inside surface, and first and second slot portions; said cage further comprises a cut-out extending along said front and top walls;
   a ball joint assembly adjustably engaged with said cage; said ball joint assembly comprising a ball joint housing having a centerline and a lower clamping plate; said ball joint housing having an outward portion and an inward portion;
   an upper clamping plate;

a fastener for removably attaching said upper clamping plate and said lower clamping plate of said ball joint assembly to said top wall of said cage; and whereby said ball joint assembly may be adjustably moved from a first position where said outward portion of said ball joint housing is disposed outside of said cavity to a second position where said outward portion of said ball joint housing is disposed within said cavity.

2. The device of claim 1, wherein said cut-out of said cage extends substantially along said front and top walls.

3. The device of claim 2, wherein said lower clamping plate comprising an upper surface, a lower surface, and a plurality of mounting holes.

4. The device of claim 3, wherein said upper clamping plate comprises an upper surface, a lower surface, a plurality of mounting holes, a front edge portion, and a cut-out having an inner edge portion; said cut-out extending inward from said front edge portion to said inner edge portion to allow access to said ball joint housing when assembled.

5. The device of claim 4, wherein said lower surface of said upper clamping plate is engaged with an outside surface of said top wall of said cage.

6. The device of claim 5, wherein said upper surface of said lower clamping plate of said ball joint assembly is engaged with an inside surface of said top wall of said cage.

7. The device of claim 6, wherein said cut-out of said cage is centrally disposed along said front and top walls of said cage.

8. The device of claim 7, wherein said cut-out of said cage extends the full length of said front wall of said cage.

9. The device of claim 8, wherein said upper clamping plate further comprises first and second side edges; said cut-out of said upper clamping plate being centrally disposed between said first and second side edges.

10. The device of claim 9, wherein said cut-out of said upper clamping plate extends inwardly a distance at least one-half the length of said upper clamping plate.

11. The device of claim 10, wherein said fastener comprises a plurality of bolts.

12. The device of claim 11, wherein said mounting holes of said upper clamping plate are threaded holes and said mounting holes of said lower clamping plate of said ball joint assembly are clearance holes; and said plurality of bolts pass through said clearance holes of said lower clamping plate of said ball joint assembly, through said first and second slot portions of said top wall of said cage, and threaded with said threaded holes of said upper clamping plate.

13. The device of claim 12, wherein said cut-out of said upper clamping plate is substantially the same shape as said inward portion of said ball joint housing.

14. The device of claim 13, wherein said cut-out of said upper clamping plate is concave shaped.

15. The device of claim 14, wherein said inward portion of said ball joint housing is convex shaped.

16. The device of claim 15, wherein said first and second slot portions of said top wall are elongated.

17. The device of claim 16, wherein said top wall of said cage is substantially perpendicular to said front wall of said cage.

18. The device of claim 17, wherein said cut-out of said cage has a centerline aligned with said centerline of said ball joint housing.

19. The device of claim 11, wherein said mounting holes of said upper clamping plate are clearance holes and said mounting holes of said lower clamping plate of said ball joint assembly are threaded holes; and said plurality of bolts pass through said clearance holes of said upper clamping plate, through said first and second slot portions of said top wall of said cage, and threaded with said threaded holes of said lower clamping plate of said ball joint assembly.

* * * * *